May 20, 1930.   C. G. G. BERGSTROM   1,759,478
SKINNING AND FATTING MACHINE
Filed April 18, 1928   3 Sheets-Sheet 1
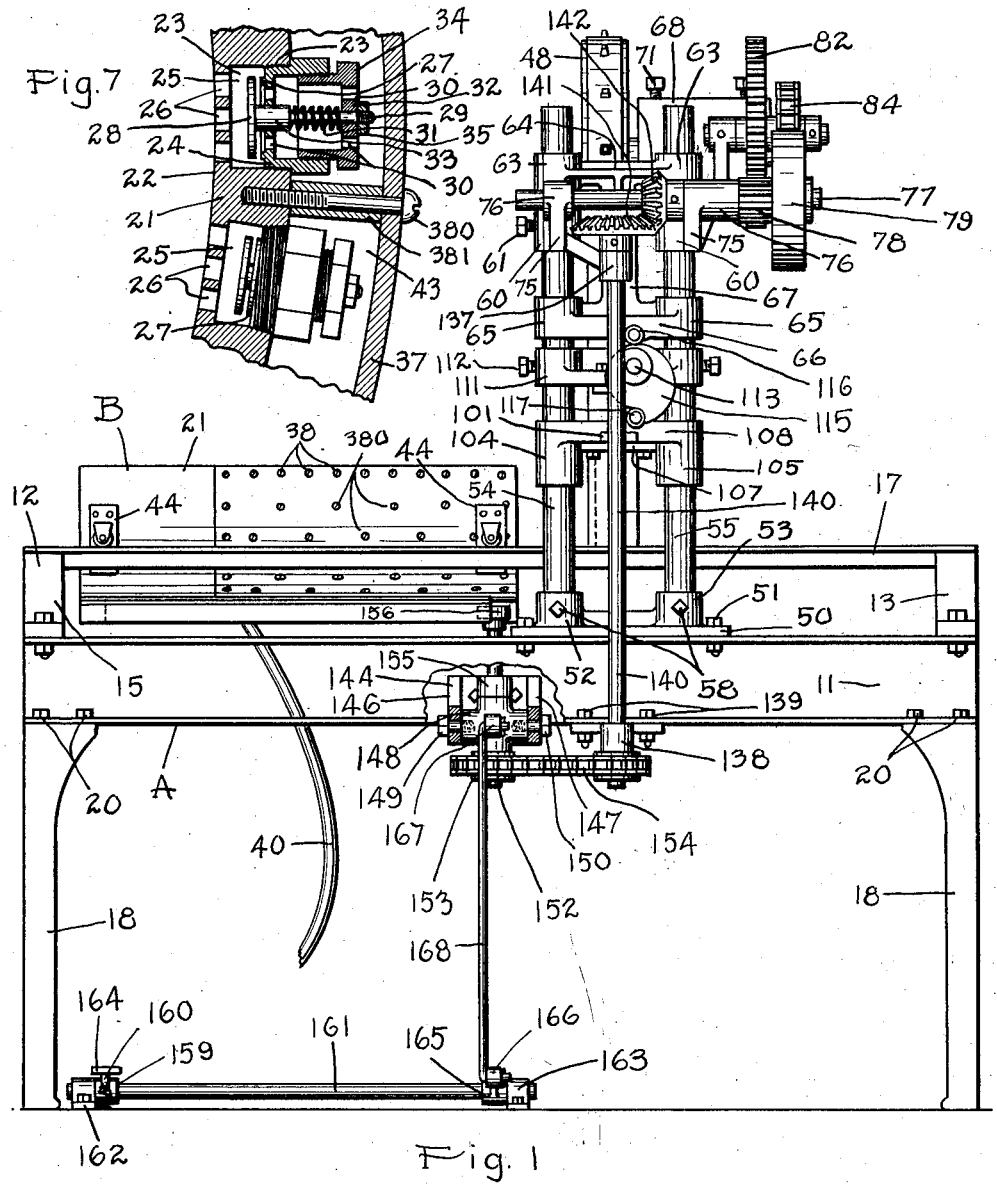
Inventor
Carl G. G. Bergstrom
By Bradbury & Caswell
Attorneys

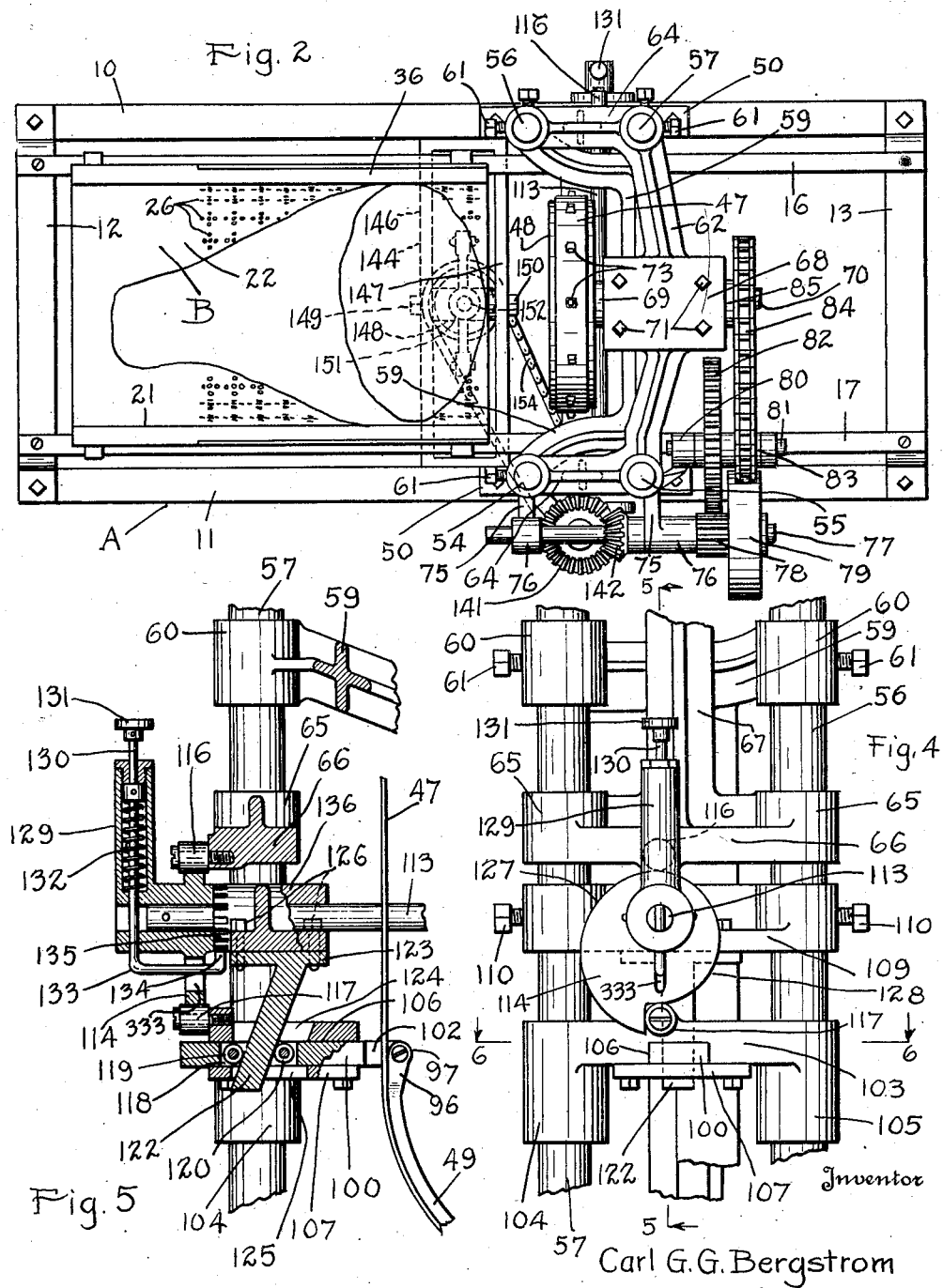

May 20, 1930.  C. G. G. BERGSTROM  1,759,478
SKINNING AND FATTING MACHINE
Filed April 18, 1928   3 Sheets-Sheet 3
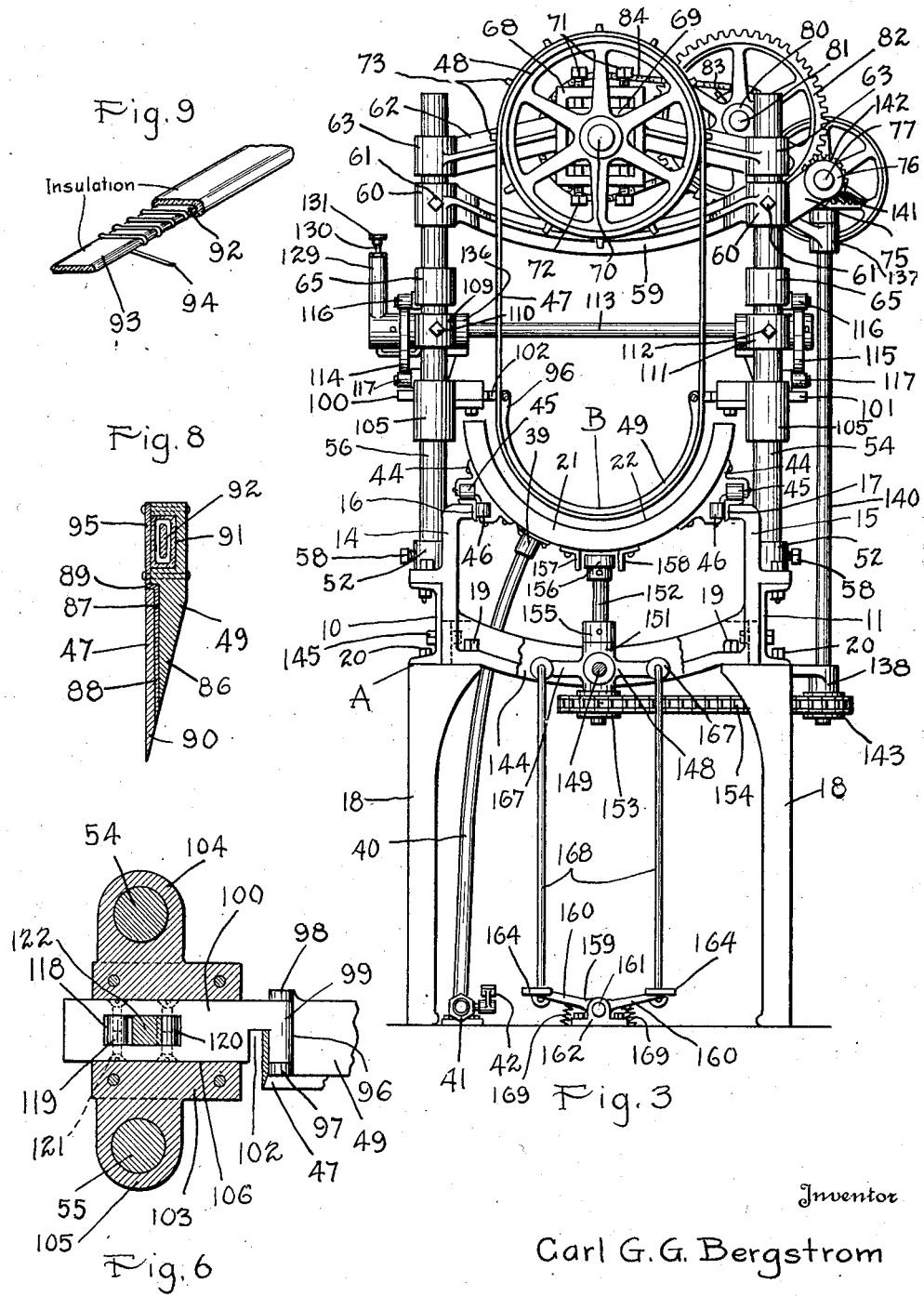
Inventor
Carl G. G. Bergstrom
By Bradbury & Cauwell
Attorneys Patented May 20, 1930

1,759,478

UNITED STATES PATENT OFFICE

CARL G. G. BERGSTROM, OF ST. PAUL, MINNESOTA

SKINNING AND FATTING MACHINE

Application filed April 18, 1928. Serial No. 270,899.

My invention relates to skinning and fatting machines and particularly to machines adapted to be used for removing skins and fat from hams and similarly formed portions of the carcasses of animals.

An object of the invention resides in providing a frame having a track along the same and in further providing a carriage movable along said track and having a concave supporting surface conforming to the shape of the ham or other object to be skinned or sliced upon which the same is supported with the portion to be removed directly in contact with said supporting surface.

Another object of the invention resides in providing a band cutter having a cutting edge disposed in a predetermined relation to said supporting surface, said carriage being movable along said cutter to feed the cutter along said carriage and between the object to be sliced or skinned and the supporting surface.

Another object of the invention resides in providing means whereby the ham or other object to be sliced or skinned may be held in firm contact with the supporting surface through the action of vacuum and to further provide means whereby the vacuum may be created only at such portions of the supporting surface on which the object actually rests so as to cause the device to function regardless of the shape or size of the objects sliced.

Another object of the invention resides in attaching uprights to said frame and in slidably mounting at the upper portion of said uprights a cross head journalling a driving wheel and in mounting at the lower portion of said uprights members supporting an arcuate guide, said wheel and guide being adapted to support the band cutter in a predetermined spaced relation relative to said supporting surface so that as the carriage and cutter are moved relative to one another the portion of the object to be sliced lying upon said surface is severed from the body portion thereof.

Another object of the invention resides in constructing said guide as an annular member having a curvature corresponding substantially to the curvature of said supporting surface.

A still further object of the invention resides in providing means whereby the said guide and supporting wheel may be simultaneously raised to vary the thickness of the slice severed at the lowermost portion and whereby the upper ends of the guide may be simultaneously moved inwardly to control the thickness of the slice at its uppermost portion.

Another object of the invention resides in providing means whereby the carriage may be propelled in either direction.

A feature of the invention resides in constructing said guide with a heating element whereby the temperature of the cutter may be raised.

With the foregoing and other objects in view, which will appear in the following description, the invention resides in the novel combination and arrangement of parts and in the details of construction hereinafter described and claimed.

In the drawings:

Fig. 1 is a side elevational view of a ham skinning machine illustrating an embodiment of my invention.

Fig. 2 is a plan view of the structure shown in Fig. 1.

Fig. 3 is an end elevational view of the structure shown in Figs. 1 and 2.

Fig. 4 is an enlarged elevational detail view of the mechanism for adjusting the depth and form of the cut.

Fig. 5 is a vertical sectional view taken on line 5—5 of Fig. 4.

Fig. 6 is a plan sectional view taken on line 6—6 of Fig. 4.

Fig. 7 is an enlarged cross sectional view of the carriage illustrating the construction of the vacuum valves.

Fig. 8 is an enlarged cross sectional view of the annular cutter guide.

Fig. 9 is a fragmentary perspective view of the heating element used in conjunction with the guide shown in Fig. 8.

In the packing industry numerous valuable hides from hams at times are sent to the rendering tanks when larger profits could be realized from them as leather material. Also, in the removal of the skins, when necessary, from hams or other cuts, large particles of fat adhere. This fat if left on the hams within required fat specifications would yield larger profits on the hams than to the rendering tanks. My invention provides a positive and automatic device whereby the skins may be quickly, cleanly, and effectively removed from portions of the hams or other cuts, and whereby a layer of fat to the fraction of an inch or more may be also cut from the exterior fat of the ham and be utilized for other purposes.

My invention proper consists primarily of framework which I have indicated in its entirety at A. This framework comprises two longitudinal frame members 10 and 11 which are connected together at their ends by means of two transverse frame members 12 and 13. These frame members may be constructed in the nature of castings and are provided as best shown in Fig. 3 with upstanding portions 14 and 15 which support two longitudinal angle members 16 and 17 serving as rails for the supports of the carriage which I have indicated in its entirety at B and which will be presently described in detail. At the four corners of the framework are attached legs 18 which may be bolted to the frame members 10 and 11 by bolts 19 and which are bolted to the transverse frame members 12 and 13 through bolts 20.

Slidably mounted upon the tracks 16 and 17 is supported the carriage B which is constructed of a casting 21 semi-circular in formation and which is arranged with its concave surface 22 facing upwardly. The casting 21 is constructed as best shown in detail in Fig. 7 with a plurality of spaced bores 23 extending completely through the back side of the said casting and to within a short distance of the surface 22 thereof. These bores are tapped as indicated at 23 to receive threaded plugs 24 which extend partially into said bores so as to provide pockets 25 adjacent the concave surface 22 of the carriage. The pockets 25 communicate with the exterior through a number of openings 26 which pass through the surface 22, a number of which are shown in Fig. 2. Along the inward end of each of the plugs 24 is provided a valve seat 27. A valve 28 adapted to become seated on seat 27 has a valve stem 29 slidably mounted in the plug 24 and in a cap 34 threaded in said plug. When raised from said valve seat communication is had between the pocket 25 and the space on the opposite side of plug 24 through a number of openings 30 which extend completely through the said plug and cap. A coil spring 31 surrounding the valve stem 29 is seated at one end against the end wall 32 of cap 34 and at its other end against an enlargement 33 on said valve stem adjacent valve 28. A nut 35 on the end of the valve stem 29 holds the valve 28 in proper position relative to the valve seat. Along the marginal portions of the casting 21 are arranged outwardly extending ribs 36. An arcuate plate 37 is attached to these ribs by means of screws 38 and is further attached to the body proper by screws 380 and spacers 381 and forms a space 43 back of the plugs 24 serving as a vacuum chamber within the interior of the carriage B adapted to communicate with the pockets 25 when the various valves 28 are open. A hose connection 39 secured to carriage B communicates with this space and has coupled to it a flexible hose 40 which may be connected to a suitable exhaust pump or a vacuum tank. A valve 41 having a pedal 42 is positioned in this hose and serves to control the vacuum created in the chamber 43. When it is desired to hold an object such as a ham or other cut of which the skin or a portion of the fat thereof is to be removed the same is merely laid upon the surface 22 and manually pressed to fit the said surface as closely as possible. The valve 41 is then opened by stepping on the pedal 42 which creates a vacuum within the chamber 43. Wherever the skin or other portion of the cut comes in direct contact with the surface 22 so as to cover the openings 26 leading to any of the various pockets 25 the rush of air into the said pockets from the exterior when valve 41 is opened is hence prevented and the said valves 20 for such pockets remain open permitting the air within said pockets to be exhausted and the surface of the ham or other object to be drawn tight to the surface 22 of carriage B. Wherever the openings 26 remain exposed air is permitted to rush freely into the pockets 25 which has the effect of closing the valves 20 and preventing the further flow of air therethrough. The suction within chamber 43 thereafter maintains these valves closed until the valve 41 is again opened. When so opened sufficient leakage occurs through the various valves and other fittings so that the vacuum within the chamber 43 is quickly relieved and the ham or other object positioned upon the carriage B may be quickly removed.

For supporting the carriage B upon the device I employ four castings 44 which are attached to the sides of the carriage as best shown in Figs. 1 and 3. These castings support rollers 45 and 46 of which the rollers 45 ride upon the horizontal flanges of the angles 16 and 17 and whereas the rollers 46 ride against the vertical flanges of said angles. By means of these rollers the carriage is supported relative to the tracks in such a manner that the same may be moved from one end thereof to the other relative to the cutter as will be presently described. It is to be noted that the hose 40 connected to the carriage B for creating vacuum therein is of sufficient length and flexibly so as to permit the carriage to move through its entire course.

The cutter proper used in conjunction with my invention consists of a thin metal band 47 which is supported upon a driving wheel 48 at its upper end and is further supported by a guide 49 at its lower end. The guide 49 is an annular member of arcuate formation and conforms to the concave surface 22 of the carriage B as best shown in Fig. 3. This guide and the wheel 48 are supported as follows: Upon the longitudinal frame members 10 and 11 of the framework A, somewhat rearwardly of the center of the device are attached two castings 50 by means of bolts 51. These two castings have bosses 52 and 53 formed thereon in which are mounted four uprights 54, 55, 56 and 57. These uprights are preferably circular in cross section though the same may be constructed of any suitable formation desired. Set screws 58 threaded in the bosses 52 and 53 serve to hold these uprights in fixed position relative to the frame A. Near the upper ends of the uprights 54, 55, 56 and 57 I employ a yoke 59 which is formed with a number of bosses 60 which receive the various uprights and which have set screws 61 threaded into the same by means of which the said yoke is firmly attached to said uprights and forms a rigid connection for the same at their upper ends. Upon these uprights are mounted slidable supports whereby the wheel 48 and the guide 49 are supported for vertical adjustment as will be presently described.

The method of supporting wheel 48 is best seen in Figs. 2 and 3. A cross head 62 is slidably mounted upon the upper end of the uprights 54, 55, 56 and 57. This cross head includes an upper set of sleeves 63 connected together by means of arms 64 and a lower set of sleeves 65 which are connected to the upper set by means of arms 66 and 67. These sleeves are all rigidly connected relative to one another and are adapted to slide simultaneously as a unit as the said cross head 62 is raised and lowered. At the center of the cross head is formed a box-like structure 68 in which is disposed a journal block 69 journalling a shaft 70 to which the wheel 48 is rigidly attached. This journal block is adjustably mounted within the box-like structure 68 through a number of adjusting screws 71 and 72 which are threaded into the walls of the said box-like structure and are situated near the ends of the same. By means of these screws angular, lateral and vertical adjustment of the wheel 48 may be had so as to properly position said wheel for the driving of the cutting band 47. The wheel 48 is formed with a number of sprocket teeth 73 which extend outwardly therefrom and are adapted to engage in corresponding sprocket holes arranged at equal intervals along the band 47. These sprocket teeth serve to effect a positive drive for the said band as the wheel 48 is rotated.

The transmission through which wheel 48 is driven is constructed as follows: On two of the bosses 60 of cross head 59 are formed outwardly extending brackets 75 provided with bearings 76. These bearings journal a transverse shaft 77 which has attached to it at the end opposite the wheel 48 a spur pinion 78 and a pulley 79. The pulley 79 is adapted to be driven from any suitable source of power such as an electric motor or a line shaft. Rearwardly of the yoke 59 the same is formed with a bracket 80 which has a trunnion 81 rigidly secured thereto and extending outwardly therefrom. This trunnion forms a bearing for a spur gear 82 and a sprocket pinion 83, which spur gear and pinion are rigidly connected together so as to travel as a single unit. The pinion 78 meshes with the gear 82 and a sprocket chain 84 passes over the sprocket pinion 83 and a sprocket wheel 85 fast on the shaft 70 which carries the driving wheel 48. As the pulley 79 is rotated the wheel 48 is driven through the gears 78 and 82 and sprockets 83 and 85 at a considerably reduced speed, thereby driving the cutter 47 in a manner to effect the slicing or skinning of the hams or other cuts positioned upon the carriage B. It will be noted that the trunnion 81 is substantially in horizontal position with respect to the shaft 70. This permits of raising the shaft 70 in a vertical direction within a certain limit determined by the slack in the sprocket chain 84 so that the cutter band 47 may be vertically adjusted as will be presently described.

The construction of the annular guide 49 is shown in detail in Fig. 8. This device is formed of a strip of more or less resilient material which is bent in the arc of a circle and which is sharpened along its forward edge as indicated at 86. A recess 87 along the outer periphery of this strip at the sharpened end thereof receives a shoe 88 which has a shoulder 89 formed thereon. This shoe may be riveted or otherwise secured to the guide 49 and forms a wearing surface for guiding the movement of the cutting band 47 which is shown in cross section in Fig. 8. The forward edge 90 of this band is sharpened and the bevel formed thereby is substantially continuous with the beveled edge 86 of the guard proper. When proper tension is placed upon the band 47 and the wheel 48 properly adjusted within the box-like structure 68 the band 47 is caused to rotate and is guided by the guide 49 so that the lowermost portion of the cutting edge falls within the groove in the shoe 88 and so that the whole of said band rides against the shoulder 89 which takes up the end thrust imparted to said cutting band when the same engages the object to be cut. In normal operation the guide 49 is so disposed that the cutter 47 is spaced the desired distance from the supporting surface 22 of carriage B and substantially conforms in curvature with said surface. When a ham or other object to be sliced is placed upon the surface 22 and the carriage B advanced along the tracks 16 and 17, the cutting edge 90 of the band 47 is caused to slice the contacting portion of the ham or other object with the surface 22 so as to sever the same from the major portion of the object to be cut. As the object is cut the major portions of the same pass through the space within the guide 49 while the severed portion passes through the space between the cutter 47 and the carriage B.

To facilitate rapid slicing I prefer to heat the cutter 47 and the guide 48 thereof which is accomplished as follows: A slot 91 is cut in the heel of the guide 49 and in this slot is laid a heating element 92 shown in detail in Fig. 9. This heating element consists of a core 93 of a suitable insulating material on which is wound a coil of resistance wire 94, the convolutions of which are suitably spaced from one another. This coil is insulated from the walls of the slot 91 by suitable insulating material and the said slot is closed by means of a plate 95 screwed or riveted to the outer surface of the said guide 49 as clearly shown in Fig. 8. When an electric current is applied to the terminals of the heating element 92 sufficient heat is generated within the guide 49 to heat the cutting band 47, particularly where the shoe 88 is constructed of a metallic substance, such as steel fibre or the like. The raising of the temperature of both the cutter and shoe causes the device to operate with less resistance when used in conjunction with hams and other cuts of meat at a temperature such as occurs in refrigerators where such meats are usually stored. If desired steam or hot water may be conducted through the passageway 91 and used for heating the cutter instead of electricity.

The structure for supporting the guide 49 is shown in detail in Figs. 5, 6 and 7. To the upper ends of guide 49 are formed fittings 96 which terminate in spaced ears 97 and 98. These ears are pivoted to the inner ends 99 of two horizontally disposed plates 100 and 101 which are recessed as indicated at 102 to receive the cutting band 47. These plates are arranged for both vertical and horizontal movement and are supported as follows: Mounted upon the two uprights 56 and 57 is a cross head 103 which is formed with two sleeves 104 and 105 bored to slide upon the said uprights. This cross head is formed near the lowermost portions thereof and intermediate the two sleeves 104 and 105 with a recess 106 adapted to snugly receive the plate 100 and guide the same for longitudinal movement. A plate 107 best shown in Figs. 4 and 5 is bolted to the underside of the cross head 103 and retains said plate in proper position within the slot or recess 106. The plate 101 is similarly mounted for sliding movement in a cross head 108 similar to the cross head 103 which slides upon the uprights 54 and 55 so that the entire guide 49 may be bodily raised relative to the surface 22 of carriage B. By forcing the plates 100 and 101 inwardly, the distance between the upper ends of the guide 49 may be varied to regulate the distance between the upper ends of the said guide and the upper ends of the carriage B. By properly adjusting said guide as to width at its upper end and its distance from the surface 22 in its lower end, the cutting band 47 can be made to cut any desired thickness of cut from the object placed upon the said surface. In this manner the device can be adjusted to remove a thin or thick hide or if desired for the purpose of removing fat from the exterior surface of the ham may be used to cut a strip of any desired thickness. In addition by properly varying the relative adjustments of the guide 49 the cutter can be made to cut a slice which is thicker at the bottom than at the sides, or vice versa.

The entire cutting band 47 is elevated by a structure best shown in Figs. 3, 4 and 5. Upon the two uprights 56 and 57 is mounted a support 109 which is secured to said uprights by means of set screws 110. A similar support 111 is attached to the two uprights 54 and 55 and is held in fixed relation thereon by means of set screws 112. These two supports provide bearings for a transverse shaft 113 which is disposed immediately back of the band 47. This shaft carries at its extreme ends two cams 114 and 115 which are arranged to operate upon rollers 116 and 117 journaled in arms 66 on cross head 62 and on the cross head 103, respectively. By means of these cams and rollers the cross head 62 carrying the wheel 48 is simultaneously elevated with the guide 49 through the action of the cutting band 47 which carries the entire weight of said guide and the two cross heads 103 and 108 forcing the rollers 117 tight against the under surface of the said cams 114 and 115. Proper tension in the band 47 to accomplish this result may be had through the adjustment of the adjusting screws 71 and 72 previously referred to.

At the same time that the guide 49 is elevated the upper ends of the same are forced inwardly to reduce the diameter of the curvature of the guide so as to cause the cutter to cut substantially parallel cuts from the ham or other objects pressed upon the surface 22. This is accomplished as follows: Referring to Fig. 6 the plate 100 is formed with an opening 118 extending completely through the same near the center thereof. This opening has journaled in it two spaced rollers 119 and 120 which are supported upon pintles 121 which pass through the said plate and journal said rollers and which may be riveted in place if desired. An inclined cam or finger 122 best shown in Fig. 5 which is attached to a base 123 operates between the two rollers 119 and 120. This cam projects through openings 124 and 125 in the cross head 103 and the plate 107 respectively, and serves to force the plate 100 inwardly upon the upper upward stroke of the cross head 103 and outwardly upon the downward stroke of said cross head. The base 123 of cam 122 is attached to the support 109 by bolts 126 by means of which the exact position of said cam relative to the rollers 119 and 120 may be adjusted at will. Plate 101 is operated by a mechanism identical with that used for operating plate 100 so that both of these plates are moved inwardly at the same time and in like manner as the cross heads 103 and 108 reciprocate in the raising of the device which is accomplished by rotating the shaft 113 in a clockwise direction as viewed from Fig. 4. The surface 127 of cam 114 engages the rollers 116 while the surface 128 of said cam engages the roller 117. Both of these surfaces are spiralled in formation, the surface 127 having greater pitch than the surface 128. This causes the wheel 48 to be raised faster than the cross heads 103 and 108 which serves to take up the slack in the band 47 occasioned by the forcing of the upper ends of the guide 49 inwardly. In this manner the said band is at all times retained taut and held in proper operating relation within the recess in the shoe 88 of guide 49 so that the cutting edge of the said band is in proper position to sever portions of the object placed upon the carriage B. In the particular embodiment of my invention which I have illustrated in these drawings, the cams 114 and 115 which are identical in construction and the cams 112 are so designed that the ends of guide 49 do not move inwardly at the same rate of speed as the lower portion of said guide is raised from the carriage B. The said guide, however, is so constructed that when the same is used for removing hides from hams and like cuts that the cutting edge of the cutting band 47 is equally spaced from the surface 22 throughout its conformity therewith. When, however, the cutter 47 is elevated to increase the thickness of the cut which is necessary in the removal of fat from the ham, it is desired to make a deeper cut at the center of the ham where the fat is the thickest, than along the outer edges of the same. For this reason the cutter 47 is so disposed as to most closely cut or sever the layer of fat in the desired thickness throughout its extent.

For oscillating the shaft 113 so as to vary the thickness of the slice severed I employ a handle 129 which is integrally constructed with the cam 114. This handle is hollow as shown in Fig. 5 and supports a rod 130 for longitudinally sliding relative to said handle. A button 131 upon the end of said rod is utilized for moving the said rod longitudinally. Within the handle 129 is disposed a spring 132 which normally holds said button 131 in its outer position. The extreme end of rod 130 is constructed with a hooked portion 133 slidable in a slot 333 in cams 114 which portion terminates in a dog 134 adapted to engage a number of ratchet teeth 135 formed along the outer periphery of the bearing 136 in which shaft 113 is journaled. By pressing upon the button 131 the dog 134 may be disengaged from the various ratchet teeth 135 and said handle 129 oscillated to adjust the position of the cutter relative to the carriage. Upon releasing the button 131 spring 132 forces said dog into engagement with the adjacent ratchet tooth and so firmly locks the device in position.

The carriage B may be advanced along the tracks 16 and 17 by power through a foot operated control so that both the hands of the operator are free to handle the hams or other cuts and to properly position and manipulate the same upon the carriage B. This is accomplished by the following construction: On the cross head 59 immediately below the shaft 77 and intermediate the bearings 76 is formed another bearing 137. A similar bearing 138 directly below the bearing 137 is bolted to the frame member 10 by means of bolts 139. These two bearings journal a vertical shaft 140 which carries at its upper end a bevel gear 141 meshing with a bevel pinion 142 fast on the shaft 77. At the lower end of this shaft is secured a sprocket pinion 143 which is driven through said shaft 140 as the pulley 79 is rotated. Between the two frame members 10 and 11 is attached a cross frame member 144 shown in dotted lines in Fig. 2 which is bolted to said frame members by means of bolts 145. This frame member is provided with two members 146 and 147 between which is journaled a casting 148. Bolts 149 and 150 are screwed into the said casting 148 and form trunnions which are journaled in the members 146 and 147. By means of this construction the casting 148 is journaled for reciprocation about a longitudinal axis being the centers of the two bolts 149 and 150. The center of the casting 148 is bored longitudinally to form a vertical bearing 151 for a vertical shaft 152 which is rotatable therein. This shaft terminates at its lower end immediately below the said casting 148 and has attached to it a sprocket wheel 153 which is driven from the sprocket pinion 143 on shaft 140 by means of a sprocket chain 154. A collar 155 on this shaft serves to hold the said shaft in proper position relative to the casting 148. At the upper end of shaft 152 which terminates within a short distance of the bottom of the carriage B is attached a roller 156 of relatively small diameter. This roller is disposed between two friction racks 157 and 158 which are attached to the underside of the carriage B in spaced relation to one another. By swinging the casting 148 so as to bring the wheel 156 in contact with the friction rack 157, said wheel causes the carriage B to move in one direction. By oscillating the casting 148 so as to bring said wheel 156 in contact with the other friction rack 158 the carriage B is caused to travel in the opposite direction. It will be noted in Fig. 1 that the friction rack 158 is shorter than the rack 157 at one end of the carriage, while the reverse is true at the other end of the carriage. By means of this construction the carriage automatically stops when the same reaches the end of its travel which is determined by the length of these racks. By now reversing the contact of the friction roller 156 the carriage can be made to travel in the opposite direction. Due to the fact that the opposite friction rack is longer than the one which the roller has last left, a positive return of the carriage is insured from either of its extreme positions.

For oscillating the casting 148 so as to cause the friction roller 156 to engage either of the friction racks 157 and 158 I employ an operating lever 159 best shown in Fig. 3 which consists of two oppositely extending arms 160. This lever is attached to the end of a longitudinal shaft 161 which is journaled in two bearings 162 and 163 attached to the floor on which the machine is placed. The arms 160 terminate in pedals 164 by means of which the shaft 161 may be rocked in either direction. At the other end of the said shaft is attached a similar lever 165 which terminates in arms 166 similar to the arms 160. The casting 148 is constructed with two substantially horizontally outwardly extending arms 167 which correspond to the arms 166 of the lever 165. Two rods or links 168 are pivotally connected with the arms 167 and the arms 166 so that pressure upon either of the pedals 164 serve to oscillate the casting 148 for bringing the friction roller 166 in contact with the friction racks 157 and 158. By means of two springs 169 operable between the arms 160 and the floor, the roller 156 is normally held in inoperative position and is automatically returned to such position when the foot is withdrawn from either of the pedals 164.

In the use of my invention hams or other cuts from which it is desired to sever slices of fat or to remove the skin or hide are placed upon the surface 22 of carriage B, overlying the various apertures 26 communicating with the pockets 25. The ham or other cut is then pressed down so as to contact with the said surface throughout the extent of the portions thereof from which it is desired to sever the fat or hide. Pedal 42 is then depressed which exhausts the air within the chamber 43 causing a vacuum in the particular pockets 25 covered by the ham and which closes the valves 28 in the remainder of the pockets. This firmly holds the ham in place upon the surface 22 and due to the flexibility of the same the surface of the ham is well drawn into the openings 26 which serve to prevent movement of the said ham along the surface 22 as well as away from the said surface. By next depressing the particular pedal 164 which causes the carriage B to move toward the cutter 47, the roller 156 is brought into contact with the friction rack 157 which feeds the carriage B along the said cutter. Cutting band 47 then severs the portion of the ham or other object in proximity to the surface 22 in accordance with the position of said cutter relative to said surface. By releasing pressure upon the pedal 164 the movement of the carriage B can be terminated at any position and upon stepping on the other pedal 164, the carriage can be returned. By slipping the roller any desired rate of feed can be secured. If the carriage is operated beyond the limit of its movement the roller 156 disengages the particular friction rack with which it was contacting and the carriage automatically stops. The other friction rack extending beyond such point is in position to be engaged by the friction roller when the opposite pedal 164 is pressed so that the carriage is automatically stopped at the end of its path of travel and may always be positively returned to its opposite position. In the removing of the skins or hides from various cuts the cutter may run completely through the cut so that the severed ham or cut is removed from the opposite end of the machine or if desired the cut may be made only partially through the ham and the carriage returned, backing the cutting band up through the cut. In such case the remainder of the hide may be removed manually or the skin cut off at the end of the cut. If desired my machine may be used for skinning bellies, shoulders and various other cuts which can be arranged in the carriage B so that the surface of the hide to be cut can be made to conform to the concave surface 22 of said carriage.

Although I have shown my invention embodied in a single operating device, yet it can be readily comprehended that various changes and alterations can be made without departing from the spirit of the invention. If desired the surface 22 of the carriage B may be constructed of other forms than semi-circular and the guide 49 can be constructed to conform therewith. Furthermore by properly designing the cams 114 and 115 and the cams 122 the cutting band can be made to cut a slice of uniform thickness and of any desired thickness within the limits of the machine or the same can be made to cut a slice of varying thickness throughout its extent.

My invention is highly meritorious in that it is fully automatic and is simple and effective in operation. The device serves to utilize skins and hides and other portions of various cuts of meats for a purpose giving a larger return to the packing houses. The device can readily be adjusted to remove either skins or fat from cuts placed upon the table so that a single machine will function to operate in either manner.

Changes in the specific form of my invention, as herein disclosed, may be made within the scope of what is claimed without departing from the spirit of my invention.

Having described my invention, what I claim as new and desire to protect by Letters Patent is:

1. In a skinning and fatting machine, a support having a curved surface, a cutter having a curved cutting edge adapted to substantially conform to said surface and to move along said surface, means for supporting the object to be sliced upon said surface, and means permitting the movement of said cutter and support relative to one another to feed said cutter through the object skinned and along said surface.

2. In a skinning and fatting machine, a support having a concave surface, an endless band having a cutting edge, a guide for holding said band in spaced relation to said concave surface and to substantially conform to the curvature thereof, means for driving said cutting band and means for guiding said support and band for movement relative to one another along said concave surface.

3. A skinning and fatting machine comprising a track, a carriage having a supporting surface slidable along said track, a band cutter having a portion of the edge thereof superimposing the supporting surface of said carriage and said band and carriage being movable in a predetermined relation relative to one another along said supporting surface, and means for driving said band.

4. A skinning and fatting machine comprising a frame, a track mounted on said frame, a carriage slidable along said track and having a concave supporting surface, uprights secured to said frame, a band cutter movably supported upon said uprights, an arcuate guide carried by said uprights and guiding said band for movement in a predetermined course spaced from the concave surface of said carriage, said carriage being movable along said track to feed said band along said surface, and means for driving said band.

5. A skinning and fatting machine comprising a frame, a track mounted on said frame, a carriage slidable along said track and having a concave supporting surface, uprights secured to said frame, a driving wheel journaled at the upper portion of said uprights, an arcuate guide mounted near the lower portion of said uprights and above said carriage and substantially conforming to the curvature of said concave surface, an endless cutting band supported by said wheel and guide, said guide serving to hold the revoluble portion of said cutting edge of said band in a predetermined spaced relation to said concave supporting surface.

6. A skinning and fatting machine comprising a frame, a track mounted on said frame, a carriage slidable along said track and having a concave supporting surface, uprights secured to said frame, a driving wheel journaled at the upper portion of said uprights, an arcuate guide mounted near the lower portion of said uprights and above said carriage and substantially conforming to the curvature of said concave surface, an endless cutting band supported by said wheel and guide, said guide serving to hold the movable portion of the cutting edge of said band in a predetermined spaced relation to said concave supporting surface, and means for propelling said carriage along said track.

7. A skinning and fatting machine comprising a frame, a track mounted on said frame, a carriage slidable along said track and having a concave supporting surface, uprights secured to said frame, a driving wheel journaled at the upper portion of said uprights, an arcuate guide mounted near the lower portion of said uprights and above said carriage and substantially conforming to the curvature of said concave surface, an endless cutting band supported by said wheel and guide, said guide serving to hold the lower portion of said cutting edge of said band in a predetermined spaced relation to said concave supporting surface, and means for varying the position of said guide relative to said supporting surface for varying the form of the slice cut by said cutter.

8. A skinning and fatting machine comprising a frame, a track mounted on said frame, a carriage slidable along said track and having a concave supporting surface, uprights secured to said frame, a driving wheel journaled at the upper portion of said uprights, an arcuate guide mounted near the lower portion of said uprights and above said carriage and substantially conforming to the curvature of said concave surface, an endless cutting band supported by said wheel and guide, said guide serving to hold the lower portion of said cutting edge of said band in a predetermined spaced relation to said concave supporting surface, and means for simultaneously varying the space between said guide and concave supporting surface and the formation of said guide to vary the thickness of the slice cut by said cutting band.

9. A skinning and fatting machine comprising a frame, a track mounted on said frame, a carriage slidable along said track and having a concave supporting surface, uprights secured to said frame, a driving wheel journaled at the upper portion of said uprights, an arcuate guide mounted near the lower portion of said uprights and above said carriage and substantially conforming to the curvature of said concave surface, an endless cutting band supported by said wheel and guide, said guide serving to hold the lower portion of said cutting edge of said band in a predetermined spaced relation to said concave supporting surface, means for simultaneously elevating said supporting wheel and guide and for bringing the upper ends of said guide together to vary the distance between said guide and concave surface at a substantially uniform rate.

10. A skinning and fatting machine comprising a support having a supporting surface and being formed with a plurality of pockets, openings extending through said surface and communicating with said pockets, a vacuum chamber communicating with said pockets, valves within said pockets adapted to close communication between said pockets and vacuum chamber, resilient means for normally holding said valves open, said valves functioning to open upon the covering of said openings and to close upon the rapid inrush of air through said openings when uncovered, and means for manually controlling the vacuum within said vacuum chamber.

11. In a supporting device for skinning and fatting machines, a member having a supporting surface and formed with a plurality of pockets communicating with the exterior through said surface, a vacuum chamber communicating with said pockets, valves within said pockets for closing communication between said pockets and vacuum chamber, resilient means for holding said valves open, said valves being arranged to close upon a rapid rush of air through the valve openings and to remain open upon the gradual passage of air through said valve openings.

12. In a supporting device for skinning and fatting machines, a member having a supporting surface and formed with a plurality of spaced bores extending completely through the side opposite said supporting surface, openings through said surface communicating with said bores, a plurality of plugs adapted to be screwed into said bores, said plugs being spaced from said surface to form a series of pockets, valve seats formed on said plugs and valves slidably mounted on said plugs and disposed within said pockets, said plugs having openings therethrough for bringing said pockets into communication with the space on the opposite side of said plugs, and a plate covering the portion of said member opposite said supporting surface to provide a vacuum chamber communicating with said pockets through said valves, and resilient means for normally holding said valves open, said valves functioning to close upon a rapid inrush of air through the valve openings and remaining open upon a gradual passage of air through the valve openings.

13. A skinning and fatting machine comprising a carriage having a concave supporting surface, a driving wheel mounted for rotation above said carriage, a band cutter mounted upon and driven by said driving wheel, an annular guide disposed in closed proximity to said supporting surface and spaced therefrom for supporting and guiding the cutting edge of said band, means for supporting the guide above said carriage, said guide and cutter jointly passing through the object sliced during the slicing operation.

14. A skinning and fatting machine comprising a band cutter, a guide for a portion of said band cutter and heating means formed in said guide in proximity to said band cutter.

15. A skinning and fatting machine comprising a band cutter formed with a cutting edge, a wedge shaped guide for guiding a portion of said cutter, said guide expanding in a direction away from the cutting edge of said cutter, and means for heating said guide and cutter positioned in the expanded portion of said guide.

16. A skinning and fatting machine comprising a support having a supporting surface arranged with a plurality of closely spaced openings therethrough, said support being constructed with a number of pockets connected with groups of said openings, said support being adapted to support a portion of meat in a manner to overlie some of said openings, means for applying a vacuum to the pockets communicating with the openings closed by the meat, and means for closing the pockets connected with the openings not covered by the meat.

17. In a supporting device for skinning and fatting machines, a member having a supporting surface and formed with a plurality of pockets communicating with the exterior through said surface, a vacuum chamber communicating with said pockets, valves within said pockets for closing communication between said pockets and vacuum chamber, resilient means for holding said valves open, and means for adjusting the action of said resilient means to cause said valves to close upon a rapid rush of air through the valve openings, and to remain open upon the gradual passage of air through said valve openings.

18. In a supporting device for skinning and fatting machines, a member having a surface formed with a plurality of spaced bores, openings through the supporting surface communicating with said bores, valve assemblies having valve chambers therein insertible in said bores and adapted to close the same, and means for bringing said valve chambers under vacuum.

19. A skinning and fatting machine comprising a support, a cutter movable in the direction of its length relative to said support, and heating means formed on said support for successively heating different portions of said cutter.

20. A skinning and fatting machine comprising a support, a band cutter movable along said support in the direction of its length, and heating means on said support for successively heating different portions of said cutter during its travel along said support.

21. A skinning and fatting machine comprising a movable carriage, a pair of spaced friction racks attached to said carriage, a pivoted shaft having a friction roller disposed between said racks, means for driving said pivoted shaft to alternately bring said roller in contact with either of said racks to propel the carriage in opposite directions, one of said friction racks extending outwardly beyond the other at one end thereof, and the other of said friction racks extending outwardly beyond the former at the opposite end thereof.

22. A skinning and fatting machine comprising a movable carriage, a pair of spaced friction racks attached to said carriage, a vertically disposed rocking shaft arranged beneath said carriage, a friction roller attached to the end of said shaft and adapted to alternately engage said racks, a transverse lever attached to said rocking shaft, links depending from said lever on opposite sides of the pivot thereof, and foot operated means for operating said links for engaging said roller with either of said racks.

23. A skinning and fatting machine comprising a support having a curved surface, an endless cutter positioned in proximity to said surface, means for guiding said cutter to travel through a portion of the length thereof in conformity with said surface, means for moving said cutter away from said surface, and means for varying the curvature of said guiding means to cause the curvature of said cutter to conform to the curvature of said support in the adjusted position of said cutter.

In testimony whereof I have affixed my signature to this specification.

CARL G. G. BERGSTROM.